UNITED STATES PATENT OFFICE.

HANS A. FRASCH, OF NEW YORK, N. Y.

PROCESS OF MAKING CAUSTIC ALKALI.

SPECIFICATION forming part of Letters Patent No. 697,465, dated April 15, 1902.

Application filed January 6, 1902. Serial No. 88,643. (No specimens.)

*To all whom it may concern:*

Be it known that I, HANS A. FRASCH, a citizen of the United States, residing at New York, in the county of New York and State of New York, have invented a certain new and useful Improvement in Processes of Making Caustic Alkali, of which the following is a full, clear, and exact description.

In my Letters Patent of the United States of America No. 688,463, granted December 10, 1901, I have described and claimed, broadly, the process of producing alkali, consisting in allowing the hydroxid of a metal to react upon the salt of an alkali in presence of ammonia, the process being described as being applicable also to the production of caustic alkali and, specifically, caustic soda.

The invention also may be carried out by saturating a solution of sodium chlorid with ammonia and adding the nickel hydroxid, and also by exposing the nickel hydroxid to anhydrous ammonia until thoroughly saturated and then treating with salt brine.

In carrying out my invention I may proceed in a number of different ways—as, for example, first, I may saturate a solution of salt, such as salt brine, with ammonia and then add the nickel hydroxid or other equivalent reagent, or, second, I may absorb the ammonia in water and dissolve the salt therein and then add the hydroxid, or, third, I may mix the sodium chlorid and the nickel hydroxid and allow it to absorb ammonia and then dissolve the alkali and filter off the nickel salt.

I take a solution of a salt of an alkali—for example, sodium chlorid—and therein absorb ammonia in about the quantity of six equivalents of ammonia to two of sodium chlorid, and to this ammoniated solution is added hydroxid of nickel until the sodium chlorid is converted into caustic soda. The nickel-ammonium chlorid thereby formed being insoluble in the solution is removed from the caustic-soda solution by filtration or other suitable means. The nickel-ammonium chlorid after washing with saturated sodium-chlorid solution to remove adhering caustic soda, is then dissolved in water, and after the addition of calcium hydrate in sufficient quantity to reconvert the ammonia and nickel hydroxid the ammonia is recovered by distillation and the nickel oxid by filtration or other means. The caustic-soda solution is concentrated first in a suitable apparatus to recover any ammonia which it may retain and finally in open vessels in any ordinary well-known manner.

Instead of proceeding as just described I may take nickel oxid and mix it with a salt of an alkali, such as sodium chlorid, and this mixture is then exposed to ammonia-vapor until a sufficient quantity of ammonia has been absorbed to complete reaction, when the ammoniated mixture is subjected to lixiviation with water or salt brine, and the caustic-alkali solution is separated by filtration from the insoluble nickel-ammonium salt.

Instead of permitting the ammonia to react upon the dry mixture of salt and nickel oxid the latter may be suspended in a solution of the alkali salt and the ammonia absorbed in the liquid mixture until the reaction is completed.

I have thus described several ways and at least two specific reagents for carrying out the invention, but wish to be understood as not limiting the invention specifically to these specified processes and reagents.

What I claim is—

1. An improvement in the process of making alkali, which consists in absorbing ammonia in a solution of a salt of an alkali, and adding thereto an oxid of a metal capable of reacting with the ammonia and producing the alkali.

2. An improvement in the process of making caustic alkali, which consists in absorbing ammonia in a solution of a salt of an alkali, and adding thereto an oxid of a metal capable of reacting with the ammonia and producing the caustic alkali.

3. The method of making caustic soda, consisting in absorbing ammonia in a solution of sodium salt, and converting the sodium salt into caustic soda by the addition of an oxid of nickel.

4. The method of making caustic soda, consisting in absorbing ammonia in a solution of sodium chlorid, adding thereto nickel hydroxid, thereby producing caustic soda and nickel-ammonium chlorid, separating the latter from the caustic-soda solution, dissolving it in water, adding calcium hydrate, and recovering the ammonia by distillation, and separating the nickel oxid by suitable means, such as filtration.

In testimony whereof I have hereunto set my hand this 2d day of January, A. D. 1902.

HANS A. FRASCH.

Witnesses:
L. S. MORRISON,
WILLIE RUSSELL.